United States Patent
Noro et al.

(10) Patent No.: US 8,304,470 B2
(45) Date of Patent: Nov. 6, 2012

(54) RESIN COMPOSITION FOR OPTICAL COMPONENTS, OPTICAL COMPONENT USING THE SAME AND PRODUCTION METHOD OF OPTICAL LENS

(75) Inventors: Hiroshi Noro, Ibaraki (JP); Akiko Nakahashi, Ibaraki (JP); Hisataka Ito, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 128 days.

(21) Appl. No.: 12/474,416

(22) Filed: May 29, 2009

(65) Prior Publication Data
US 2009/0295003 A1 Dec. 3, 2009

(30) Foreign Application Priority Data

May 30, 2008 (JP) ................. 2008-142150
May 30, 2008 (JP) ................. 2008-142151

(51) Int. Cl.
C08F 2/50 (2006.01)
C08J 3/28 (2006.01)
B29D 11/00 (2006.01)
B29D 11/02 (2006.01)
B29C 35/08 (2006.01)

(52) U.S. Cl. ............ 522/170; 522/64; 522/87; 522/134; 522/143; 522/181; 522/178; 264/1.31; 264/1.32; 264/1.36; 264/1.38; 264/494; 264/495; 264/496

(58) Field of Classification Search .................. 522/170, 522/178, 181, 134, 143, 168, 64, 87; 264/1.31, 264/1.32, 1.36, 1.38, 494, 495, 496
See application file for complete search history.

(56) References Cited

U.S. PATENT DOCUMENTS

| 7,817,886 B2 * | 10/2010 | Juni ................................ 385/33 |
| 2002/0161068 A1 | 10/2002 | Watanabe et al. |
| 2006/0009562 A1 * | 1/2006 | Sasaki ........................... 524/430 |
| 2007/0172772 A1 | 7/2007 | Ozawa et al. |

FOREIGN PATENT DOCUMENTS

| JP | 11246647 | 9/1999 |
| JP | 2001-310938 A | 11/2001 |
| JP | 2003-177260 A | 6/2003 |
| JP | 2005338780 A | 12/2005 |
| JP | 2006251017 | 9/2006 |
| JP | 3926380 B1 | 3/2007 |

(Continued)

OTHER PUBLICATIONS

Extended European Search Report dated Oct. 19, 2009.

(Continued)

*Primary Examiner* — Sanza McClendon
(74) *Attorney, Agent, or Firm* — Sughrue Mion, PLLC

(57) ABSTRACT

The present invention relates to a resin composition for optical components, which is an ultraviolet-curable transparent resin composition used as a material for an optical component, in which the resin composition includes (A) an epoxy resin having two or more epoxy groups in one molecule thereof, (B) an oxetane compound having one or more oxetanyl groups in one molecule thereof and (C) a photo-acid generator, and in which the component (C) is contained in an amount of 0.01 to 2.0 parts by weight based on 100 parts by weight of a total amount of the components (A) and (B). The present invention also relates to an optical component obtained by using the resin composition for optical components, and a production method thereof.

8 Claims, 2 Drawing Sheets

FOREIGN PATENT DOCUMENTS

| | | |
|---|---|---|
| JP | 2007070324 | 3/2007 |
| JP | 2008-038114 A | 2/2008 |
| JP | 2008180533 | 8/2008 |
| KR | 2003-0010527 A | 2/2003 |
| WO | 2005/116036 A1 | 12/2005 |

OTHER PUBLICATIONS

Japanese Office Action issued on Sep. 20, 2011 in counterpart Japanese Application No. 2008-142150.

Chinese Office Action issued in Application No. 200910142614.2 dated Jan. 5, 2012.

Japanese Office Action dated Jan. 18, 2012 issued by the Japanese Patent Office in counterpart Japanese Patent Application No. 2008-142151.

Japanese Office Action issued in Application No. 2008-142151 dated May 9, 2012.

Decision for Refusal dated May 21, 2012 issued by the Japanese Patent Office in counterpart Japanese Patent Application No. 2008-142150.

Communication dated Jul. 3, 2012 issued by The State Intellectual Property Office of the People's Republic of China in corresponding Chinese Application No. 200910142614.2.

* cited by examiner

RESIN COMPOSITION FOR OPTICAL COMPONENTS, OPTICAL COMPONENT USING THE SAME AND PRODUCTION METHOD OF OPTICAL LENS

FIELD OF THE INVENTION

The present invention relates to a resin composition for optical components and an optical component using the same. More specifically, the present invention relates to a resin composition for optical components which is used as a material of an optical lens or a transparent protective plate in an imaging device and the like and is used for adhesion or the like of such an optical component, and an optical component using the resin composition. The present invention also relates to a method for producing an optical lens composed of a transparent resin by using the above-described resin composition for optical components, and an optical lens obtained by the production method.

BACKGROUND OF THE INVENTION

An imaging device used in a cellular phone, a digital still camera or the like is mounted with an optical lens for imaging. As for such an optical lens, an organic-inorganic hybrid lens (hereinafter simply referred to as a "hybrid lens") which is composed of a glass, a thermoplastic resin or the like or is obtained by forming a thermoplastic resin composition into a lens shape on a glass substrate has been conventionally used. However, since the glass lens is expensive, a thermoplastic resin lens or a hybrid lens is recently predominating (see, Japanese Patent No. 3,926,380).

In mounting an imaging device using such a lens on a printed board, as the method usually employed for connecting these two members (method for mounting the imaging device), a method of connecting using a socket pin or a method of previously soldering an imaging elemental device (a device after removing an optical lens unit from an imaging device) on a substrate and then mounting an optical lens unit may be mentioned. Such methods are taken so as to avoid a problem that the thermoplastic resin as a lens material is deformed due to heat during solder reflow.

However, with recent widespread penetration of a cellular phone with an imaging device, for the purpose of enabling more inexpensive and higher-volume production, a system of mounting an imaging device with an optical lens unit en bloc by solder reflow is demanded. The conventional optical lens using a thermoplastic resin as the lens material cannot meet this requirement, because there is a problem that, as described above, the resin deforms due to heat during solder reflow.

Accordingly, studies are being made on whether an imaging device (with an optical lens unit) can be mounted en bloc by a reflow system as described above by using a thermosetting resin as the lens material. Also, use of a thermosetting resin not only for a lens but also for a transparent protective plate of an imaging device or for adhesion or the like of such an optical component is being studied.

For example, since a thermosetting silicone resin is transparent and less liable to heat discoloration, its application to the usage above may be expected. However, the silicon resin generally exhibits low adherence to glass or the like, making difficult its application, for example, to a hybrid lens. Also, because of its low glass transition temperature and large thermal expansion coefficient, it may be caused to undergo the heat shrinkage due to heat in the use environment and lower the optical properties.

Furthermore, for example, it is possible to obtain a molded article having high heat resistance and high transparency from a conventional ultraviolet-curable acrylic material. However, due to its large curing shrinkage percentage, the obtained lens is inferior in dimensional stability and may be involved in a problem such as generation of warpage. In addition, for example, a conventional epoxy resin composition has a high glass transition temperature and it is possible to obtain a lens molded article with excellent dimensional stability from a conventional epoxy resin composition. However, there may arise a problem that coloration readily occurs by heating.

SUMMARY OF THE INVENTION

Under these circumstances, the present invention has been made and an object of the present invention is to provide a resin composition for optical components for obtaining an optical component excellent in the transparency and heat resistance reliability at the production of an optical component in an imaging device or the like, and an optical component obtained using the resin composition. Another object of the present invention is to provide a method for producing an optical lens which is the above-described optical component, and an optical lens obtained by the production method.

Namely, the present invention relates to the following 1 to 9.

1. A resin composition for optical components, which is an ultraviolet-curable transparent resin composition for a material of an optical component,
in which the resin composition includes the following components (A) to (C):
   (A) an epoxy resin having two or more epoxy groups in one molecule thereof;
   (B) an oxetane compound having one or more oxetanyl groups in one molecule thereof; and
   (C) a photo-acid generator;
and in which the component (C) is contained in an amount of 0.01 to 2.0 parts by weight based on 100 parts by weight of a total amount of the components (A) and (B).

2. The resin composition for optical components according to 1., in which the (C) photo-acid generator is an onium salt including an anion component represented by the following formula (1) and a cation component:

$$[PF_n(X)_{6-n}]^-  \quad (1)$$

in which n is an integer of 1 to 5, and X is a fluorinated alkyl group having a carbon number of 1 to 9 or a fluorinated phenyl group.

3. The resin composition for optical components according to 2., in which the amount of the (C) photo-acid generator is 0.01 to 0.5 parts by weight based on 100 parts by weight of the total amount of the components (A) and (B).

4. An optical component obtained by using the resin composition for optical components described in any one of 1. to 3.

5. The optical component according to 4., which is an optical lens.

6. A method for producing an optical lens, the method including:
filling the resin composition for optical components according to any one of 1. to 3. into a lens shape-forming mold;
irradiating the resin composition in the forming mold with an ultraviolet ray to cure the resin composition into a lens shape, thereby obtaining a cured product; and
subjecting the cured product to a heat treatment.

7. The method for producing an optical lens according to 6., which includes: potting the resin composition for optical components on a transparent substrate; and pressing the lens shape-forming mold thereon to fill the resin composition into the forming mold.

8. The method for producing an optical lens according to 6. or 7., in which the heat treatment is performed at 80 to 150° C. for 1 to 5 hours.

9. An optical lens obtained by the method according to any one of 6. to 8.

The present inventors have made intensive studies to attain the above-described objects. In the course of studies, a specific ultraviolet-curable transparent resin composition containing the components (A) to (C) was used as an optical component material because of its being transparent and less liable to heat discoloration, as a result, this resin has been found to be excellent in the transparency and heat resistance. Also, experiments were repeated by envisaging use of the specific ultraviolet-curable transparent resin composition above as an optical lens material, as a result, it has been found that when the specific ultraviolet-curable transparent resin composition is filled in a lens shape-forming mold and an ultraviolet ray is irradiated on the resin composition in the forming mold to cure the resin composition into a lens shape and when the obtained cured product in this state directly or after removing the cured product from the forming mold is heat-treated, an optical lens having mechanical properties stable to thermal stress can be produced. The present invention has been accomplished based on these findings.

As described above, the resin composition for optical components of the present invention includes an epoxy resin having two or more epoxy groups in one molecule thereof, an oxetane compound having one or more oxetanyl groups in one molecule thereof and a photo-acid generator and is excellent in the transparency and heat resistance. Therefore, the ultraviolet deterioration or the problem of deformation or discoloration due to heat during solder reflow can be overcome. Also, this resin composition exhibits high adhesive property and can be used for adhesion or the like of an optical component such as optical lens or transparent protective plate, for example, in an imaging device. The production method of an optical lens of the present invention includes: filling the specific ultraviolet-curable transparent resin composition above into a lens shape-forming mold; irradiating the resin composition in the forming mold with an ultraviolet ray to cure the resin composition into a lens shape, thereby obtaining a cured product; and heat-treating the cured product. By such a production method, an optical lens having mechanical properties stable to thermal stress, as well as excellent transparency and high heat discoloration resistance, can be obtained. Also, since the resin composition exhibits high adherence to glass or the like, in the production method of the present invention, the optical lens can be produced as a high-quality hybrid lens by potting the ultraviolet-curable transparent resin composition on a transparent substrate such as glass (resin potting), pressing the lens shape-forming mold thereon to fill the resin composition into the forming mold, and performing ultraviolet irradiation and heat treatment of the resin composition as above, thereby allowing the resin composition to be cured and integrated with the transparent substrate.

By setting the amount of the photo-acid generator in the resin composition within the specific range, curability, heat discoloration resistance and the like can be advantageously controlled.

The optical component such as optical lens obtained using the resin composition has, as described above, stable mechanical properties without causing discoloration or deformation due to heat during solder reflow and therefore, can be advantageously used when mounting an imaging device en bloc by solder reflow.

BRIEF DESCRIPTION OF THE DRAWINGS

FIG. 1A shows a state of the ultraviolet-curable transparent resin composition being potted on a substrate, FIG. 1B shows a state of the resin composition being filled into a forming mold by pressing the lens shape-forming mold, FIG. 1C shows a state of an ultraviolet ray being irradiated on the filled resin composition, and FIG. 1D shows a state of the optical lens being demolded.

DESCRIPTION OF REFERENCE NUMERALS AND SIGNS

Figure 1A:
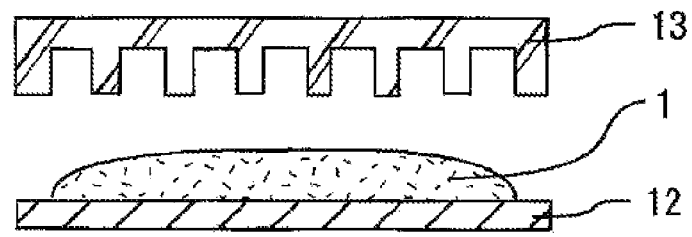
FIGS. 1A to 1D are an explanatory view showing the production process of the optical component (optical lens) of the present invention.

11 Optical lens
12 Substrate

DETAILED DESCRIPTION OF THE INVENTION

Embodiments of the present invention are described in detail bellow.

The resin composition for optical components of the present invention is an ultraviolet-curable transparent resin composition for an optical component material and includes the following components (A) to (C) in a specific ratio; and the production method of an optical lens of the present invention includes, as described above, filling an ultraviolet-curable transparent resin composition including: the following components (A) to (C) in a specific ratio into a lens shape-forming mold; irradiating the resin composition with an ultraviolet ray to cure the resin composition into a lens shape; and heat-treating the produced cured product as it is or after removal from the forming mold:

(A) an epoxy resin having two or more epoxy groups in one molecule thereof, (B) an oxetane compound having one or more oxetanyl groups in one molecule thereof, and (C) a photo-acid generator.

A compound having two or more epoxy groups in one molecule thereof is used for the (A) epoxy resin, and examples thereof include 1,5-hexadiene diepoxide, 1,7-octadiene diepoxide, 1,9-decadiene diepoxide, bisphenol A-type epoxy resin, bisphenol F-type epoxy resin, hydrogenated bisphenol A-type epoxy resin, hydrogenated bisphenol F-type epoxy resin, naphthalene-type epoxy resin, fluorene-type epoxy resin, bisphenol S-type epoxy resin, an alicyclic epoxy resin [e.g., 3,4-epoxycyclohexylmethyl-3,4-epoxycyclohexane carboxylate, 1,2-epoxy-4-(2-oxylanyl)cyclohexane adduct of 2,2-bis(hydroxymethyl)-1-butanol], an epoxy resin where hydrogen of such an epoxy resin is partially substituted by a tert-butyl group, a trifluoromethyl group or a fluorine, and a perfluoroepoxy resin of perfluorinated type. These compounds are used alone or in combination thereof. Above all, in view of curability and flowability, 3,4-epoxycyclohexylmethyl-3,4-epoxycyclohexane carboxylate is preferably used in combination with various epoxy resins above.

A compound having one or more oxetanyl groups in one molecule thereof is used for the (B) oxetane compound, and examples thereof include 1,4-bis{[(3-ethyl-3-oxetanyl)methoxy]methyl}benzene, di[2-(3-oxetanyl)butyl]ether, 3-ethyl-3-phenoxymethyloxetane, 3-ethyl-3-hydroxymethyloxetane, 1,4-bis[(3-ethyloxetan-3-yl)methoxy]benzene, 1,3-bis[(3-ethyloxetan-3-yl)methoxy]benzene, 1,2-bis[(3-ethyloxetan-3-yl)methoxy]benzene, 4,4'-bis[(3-ethyloxetan-3-yl)methoxy]biphenyl, 2,2'-bis[(3-ethyl-3-oxetanyl)methoxy]biphenyl, 3,3',5,5'-tetramethyl[4,4'-bis(3-ethyloxetan-3-yl)methoxy]biphenyl, 2,7-bis[(3-ethyloxetan-3-yl)methoxy]naphthalene, 1,6-bis[(3-ethyloxetan-3-yl)methoxy]-2,2,3,3,4,4,5,5-octafluorohexane, 3(4),8(9)-bis[(1-ethyl-3-oxetanyl)methoxymethyl]-tricyclo[5.2.1.2.6]decane, 1,2-bis{[2-(1-ethyl-3-oxetanyl)methoxy]ethylthio}ethane, 4,4'-bis[(1-ethyl-3-oxetanyl)methyl]thiodibenzene thioether, 2,3-bis[(3-ethyloxetan-3-yl)methoxymethyl]norbornane, 2-ethyl-2-[(3-ethyloxetan-3-yl)methoxymethyl]-1,3-O-bis[(1-ethyl-3-oxetanyl)methyl]-propane-1,3-diol, 2,2-dimethyl-1,3-O-bis[(3-ethyloxetan-3-yl)methyl]-propane-1,3-diol, 2-butyl-2-ethyl-1,3-O-bis[(3-ethyloxetan-3-yl)methyl]-propane-1,3-diol, 1,4-O-bis[(3-ethyloxetan-3-yl)methyl]-butane-1,4-diol and 2,4,6-O-tris[(3-ethyloxetan-3-yl)methyl]cyanuric acid. These compounds are used alone or in combination thereof.

In view of curability and adhesive property, the blended amount of the (B) oxetane compound is preferably 5 to 50 wt %, more preferably 10 to 40 wt %, based on the total weight of the components (A) and (B).

As for the (C) photo-acid generator used in combination with the components (A) and (B), a compound capable of generating a cation-polymerizable acid upon irradiation with an ultraviolet ray is used. Examples of such a photo-acid generator include an onium salt including an anion component represented by $SbF_6^-$, $PF_6^-$, $BF_4^-$, $AsF_6^-$, $(C_6F_5)_4^-$, or the following formula (1) and a cation component:

$$[PF_n(X)_{6-n}]^- \qquad (1)$$

in which n is an integer of 1 to 5, and X is a fluorinated alkyl group having a carbon number of 1 to 9 or a fluorinated phenyl group.

Examples of the onium salt having the above-described anion component include a diazonium salt, a sulfonium salt, an iodonium salt, a selenium salt, a pyridinium salt, a ferrocenium salt and a phosphonium salt. These salts are used alone or in combination thereof. In view of curability and transparency, an onium salt having $SbF_6^-$ as the anion component is preferred. Also, in view of smaller environmental load as well as curability and transparency, an onium salt having an anion component represented by formula (1) is more preferred. The anion component represented by formula (1) is preferably $PF_4(CF_2CF_3)_2^-$. In view of anion production rate, an aromatic sulfonium salt is preferred, and a triarylsulfonium salt is more preferred.

From the standpoint of coloration resistance as well as curability and adhesive property, the blended amount of the (C) photo-acid generator is preferably 0.01 to 2.0 parts by weight (hereinafter simply referred to as "parts") based on 100 parts of the total weight of the components (A) and (B). In particular, the tipper limit of the amount of the component (C) is preferably 1.0 part, more preferably 0.5 parts, still more preferably 0.4 parts, and the lower limit of the amount of the component (C) is preferably 0.02 parts, more preferably 0.05 parts, still more preferably 0.1 part.

Incidentally, in the resin composition for optical components of the present invention, in addition to these components, a photosensitizer having anthracene, phenanthrene, carbazole, naphthalene or the like, a silane-based or titanium-based adhesion promoter, a flexibility imparting agent such as synthetic rubber or polyorganosiloxane, an antioxidant, a defoaming agent, a hydrocarbon-based wax, an inorganic filler and the like may be appropriately blended, according to the necessity.

The resin composition prepared by mixing the above-described components in a predetermined ratio is formed into a sheet or filled in a forming mold and then cured by ultraviolet irradiation, whereby the optical component of the present invention can be obtained. Incidentally, a heat treatment may be performed according to the necessity, after the ultraviolet irradiation. Above all, the optical lens of the present invention can be obtained by mixing the components above in a predetermined ratio, filling the resulting ultraviolet-curable transparent composition into a lens shape-forming mold, irradiating an ultraviolet ray on the resin composition to cure the resin composition into a lens shape, and then heat-treating the cured product. As described above, following the ultraviolet irradiation, this heat treatment may be performed before or after demolding the cured product of the resin composition from the forming mold.

Figure 1B:
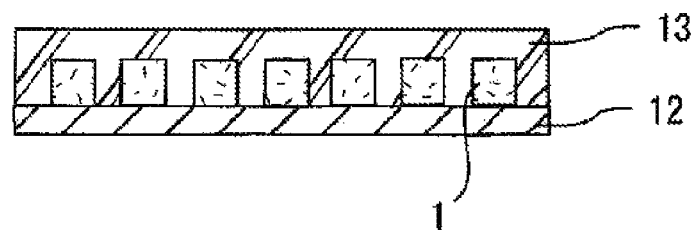

For example, in the case of producing an optical lens, this is specifically performed as follows. That is, as shown in FIG. 1A, the resin composition 1 is potted (resin potting) on a substrate 12, and a lens shape-forming mold 13 is pressed thereon, whereby as shown in FIG. 1B, the resin composition 1 is filled into the forming mold 13.

Figure 1C:
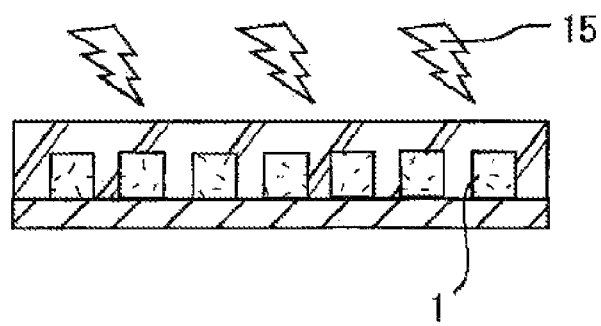
Figure 1D:
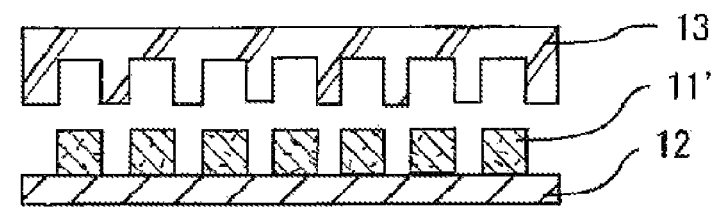
Figure 2:
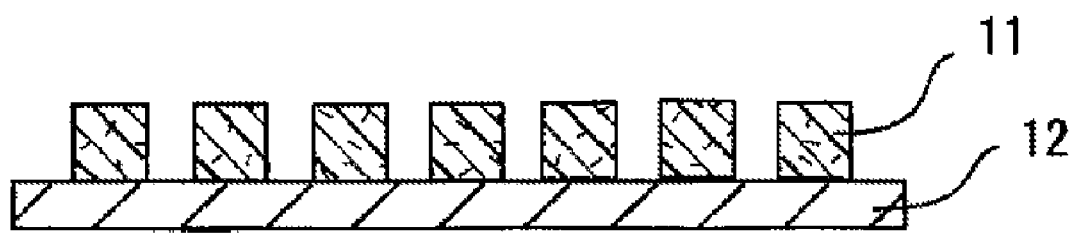
FIG. 2 is a cross-sectional view showing an optical component (optical lens) obtained by the production method illustrated in the production process above.

Thereafter, as shown in FIG. 1C, the resin composition 1 is cured by irradiating an ultraviolet ray 15 thereon through the forming mold 13 and then, as shown in FIG. 1D, the cured product 11' is demolded and appropriately heat-treated, whereby an optical lens 11 shown in FIG. 2 is obtained. Incidentally, following the ultraviolet irradiation, the heat treatment may be performed before or after demolding the cured product of the resin composition from the forming mold. The optical lens 11 can be produced as a high-quality hybrid lens by integrating it with the substrate 12 (the substrate 12 is appropriately cut to match the size of the optical lens 11). Also, in the case of using the optical lens 11 by removing it from the substrate 12, a release sheet is used for the substrate 12.

As the lens shape-forming mold 13, for example, a metal-made, glass-made or plastic-made mold may be used. However, as shown in FIGS. 1A to 1D, in the case of curing the resin composition 1 by ultraviolet irradiation through the lens shape-forming mold 13, a glass-made or transparent resin-made ultraviolet-transmitting shape-forming mold is used. Above all, in view of productivity and durability, a glass-made or transparent silicone resin-made shape-forming mold is preferred.

Also, as shown in FIGS. 1A to 1D, in the case of using a substrate 12, the material therefor is preferably a transparent material having high heat resistant because of its adaptability to ultraviolet irradiation (ultraviolet transmittance) or heat treatment. In the case where the substrate 12 has transparency, ultraviolet irradiation on the resin composition can be performed not only through the forming mold 13 but also through the substrate 12, and this leads to an increase in the latitude of ultraviolet irradiation. Furthermore, in the case where the substrate 12 is composed of, for example, various glass materials such as quartz glass, Pyrex (registered trademark) glass and BK-7 (produced by SCHOTT GLAS) or a plastic material that is transparent and is not softened at the reflow temperature (around 260° C.) (e.g., polyimide resin, silicone resin), the substrate 12 exhibits high adherence to the resin composition 1 and is free from discoloration or deformation due to heat during solder reflow. Therefore, the optical lens can be produced as a high-quality hybrid lens by integrating the substrate 12 with the cured product (optical lens 11) of the resin composition 1. On the other hand, in the case where the cured product (optical lens 11) obtained by curing the resin composition 1 on the substrate 12 is removed from the substrate 12 and used as an optical lens, in view of transparency or the like, a release sheet such as PET film, PP film, PTFE film or ETFE film is suitably used as the substrate 12.

A mercury lamp can be used as the light source for the ultraviolet irradiation, and the irradiation may be appropriately selected according to the intended thickness of the optical lens. For example, a molded product (optical lens) of 300 µm in thickness is preferably irradiated at an irradiation energy of 2,000 to 20,000 mJ/cm$^2$, more preferably 3,000 to 15,000 mJ/cm$^2$, from the standpoint of successfully performing its ultraviolet curing. If the ultraviolet irradiation energy is less than this range, the cured product (optical lens 11) of the resin composition 1 may be separated from the substrate 12 at the removal of the shape-forming mold after ultraviolet irradiation and integrated with the forming mold 13, whereas if the ultraviolet irradiation energy exceeds the range above, ultraviolet deterioration may occur in the cured product (optical lens 11) of the resin composition 1 to cause serious coloration by a subsequent heat treatment.

A heat treatment is preferably performed after the ultraviolet irradiation, because the glass transition temperature of the cured product as determined by the dynamic viscoelasticity measurement can reach the desired glass transition temperature. As for the conditions of the heat treatment, in view of productivity, the heat treatment is preferably performed at 80 to 150° C. for 1 to 5 hours. The upper limit of the heating temperature is more preferably 130° C., still more preferably 120° C. On the other hand, the lower limit of the heating temperature is more preferably 120° C. The heating time is more preferably from 1 to 3 hours, still more preferably about 1 hour. Whether the heat treatment is successfully performed or not can be confirmed by the curved state in the temperature region of 25 to 260° C. in a curve line (plotting) of tan δ obtained by measuring the storage modulus and loss modulus of the molded product after heat treatment. That is, when a specimen is repeatedly measured two times and fluctuation in the rising temperature of tan δ is within 10° C., it may be considered that fluctuation in the glass transition temperature due to heating at the measurement is not generated, and it can be judged that a sufficiently cured state is achieved by the heat treatment before the measurement.

The optical lens is, for example, as shown in FIG. 2, the cured product (optical lens 11) of the ultraviolet-curable transparent composition oil the substrate 12, which is formed in an arbitrary three-dimensional shape such as columnar, cylindrical, semispherical, pyramidal or Fresnel structure. As described above, according to the material of the substrate 12, a hybrid lens may be produced by integrating the substrate with the resin cured product (optical lens 11), or the resin cured product per se may be used as the optical lens by removing the resin cured product (optical lens 11) from the substrate 12. Incidentally, the surface of the optical lens is coated with an antireflection coat material, according to the necessity.

The glass transition temperature of the optical component (resin cured product) of the present invention including the above-described optical lens is, in view of temperature cyclability and heat resistance, preferably 100° C. or more, more preferably 120° C. or more. If the glass transition temperature is less than 100° C., the amount of thermal contraction due to temperature cycle is increased and mismatch of the thermal expansion coefficient with the antireflection coat material may cause separation or cracking of the antireflection coat material.

The optical component of the present invention is not discolored or deformed even by the heat during solder reflow and assured of stable mechanical properties and therefore, is advantageously usable when mounting an imaging device en bloc by solder reflow.

EXAMPLES

Examples and Comparative Examples are described below, but the present invention is not limited to these Examples.

Production of Ultraviolet-Curable Transparent Resin Composition and Evaluation of Transparency and Glass Transition Temperature Thereof The following epoxy resins, oxetane compounds and photo-acid generators were prepared.

Epoxy Resin:
(a) Liquid bisphenol A-type epoxy resin ("EPIKOTE 827" trade name, produced by Japan Epoxy Resins Co., Ltd.)
(b) Liquid alicyclic epoxy resin ("CELLOXIDE 2021P", trade name, produced by Daicel Chemical Industries, Ltd.)
(c) Fluorene-type epoxy resin ("ONCOAT EX-1040", trade name, produced by Nagase & Co., Ltd.)

Oxetane Compound:
(a) 3-Ethyl-3-phenoxymethyloxetane ("ARON OXETANE OXT-211", trade name, produced by Toagosei Co., Ltd.)
(b) Bis(3-ethyl-3-oxetanylmethyl)ether ("ARON OXETANE OXT-221", trade name, produced by Toagosei Co., Ltd.)
(c) 3-Ethyl-3-hydroxymethyloxetane "ARON OXETANE OXT-101" trade name, produced by Toagosei Co., Ltd.)

Photo-Acid Generator:
(a) A 50 wt % propylene carbonate solution of triarylsulfonium salt of tetra(pentafluoroethyl)difluorophosphoric acid ("CPI-200K", trade name, produced by SAN-APRO Ltd.)
(b) A 50 wt % propylene carbonate solution of triarylsulfonium salt of hexafluorophosphoric acid ("CPI-101P", trade name, produced by SAN-APRO Ltd.)

Examples 1 to 8 and Comparative Examples 1 and 2

Respective components of the epoxy resin and oxetane compound above were blended in a ratio shown in Table 1 below, then heat-melted according to the necessity, and melt-mixed. Subsequently, the photo-acid generator above was blended in a ratio shown in Table 1 below, and the mixture was stirred at a rotation number of 300 rpm for 10 minutes at 50° C. to obtain a resin composition (ultraviolet-curable transparent resin composition).

The thus-obtained resin compositions were evaluated for various properties according to the following criteria. The results obtained are shown together in Table 1 below.

Transparency:

Each resin composition was film-formed on a silicone release-treated PET film (DIAFOIL MRA-50, produced by Mitsubishi Polyester Film Corp.) to a thickness of 600 µm, and the film was irradiated with an ultraviolet ray (amount of ultraviolet ray: 8,000 mJ/cm$^2$) to effect primary curing and then heat-cured at 100° C. for 1 hour to obtain a molded product. Furthermore, the molded product was reflowed at 260° C. for 10 seconds. The resin cured product after the ultraviolet (UV) irradiation, heat curing and reflow was cut into a specimen of 20 mm in width and 30 mm in length and measured for the yellow index value (Y.I. value) in a transmission mode by a color computer (SM-T, manufactured by Suga Test Instruments Co., Ltd.).

Glass Transition Temperature:

Each resin composition was film-formed on a silicone release-treated PET film ("DIAFOIL MRA-50", produced by Mitsubishi Polyester Film Corp.) to a thickness of 600 μm, and the film was irradiated with an ultraviolet ray (amount of ultraviolet ray: 8,000 mJ/cm$^2$) to effect primary curing and then heat-cured at 100° C. for 1 hour to obtain a molded product. This molded product was cut into a specimen of 5 mm in width and 35 mm in length, and a tan δ curve based on the storage modulus and loss modulus measured by a dynamic viscoelasticity meter (RS-II, manufactured by Rheometrics) at a frequency of 1 Hz in a temperature range of RT (25° C.) to 260° C., was obtained. The peak value of the obtained tan δ curve was defined as the glass transition temperature (Tg). When Tg was 100° C. or more, this was rated "Good".

TABLE 1

|  |  | Example |  |  |  |  |  |  |  | Comparative Example |  |
|---|---|---|---|---|---|---|---|---|---|---|---|
|  |  | 1 | 2 | 3 | 4 | 5 | 6 | 7 | 8 | 1 | 2 |
| Epoxy resin | a | — | — | — | — | — | — | 40 | 40 | — | — |
|  | b | 35 | 35 | 35 | 35 | 35 | 35 | 40 | 40 | 35 | 35 |
|  | c | 35 | 35 | 35 | 35 | 35 | 35 | — | — | 35 | 35 |
| Oxetane | a | 30 | 30 | 30 | 30 | 30 | — | 20 | — | 30 | 30 |
|  | b | — | — | — | — | — | — | — | 20 | — | — |
|  | c | — | — | — | — | — | 30 | — | — | — | — |
| Photo-acid generator | a | 0.1 | 0.2 | 0.3 | 0.4 | 0.5 | 0.1 | 0.1 | 0.1 | 1.0 | — |
|  | b | — | — | — | — | — | — | — | — | — | 6.0 |
| Transparency | After UV irradiation (Y.I. value) | 2.6 | 3.0 | 3.6 | 4.2 | 4.6 | 2.6 | 2.8 | 2.8 | 7.2 | 6.3 |
|  | After heat-curing (Y.I. value) | 2.9 | 3.2 | 4.1 | 5.8 | 9.8 | 2.7 | 3.1 | 2.9 | 22 | 2.5 |
|  | After reflow (Y.I. value) | 4.7 | 16 | 53 | 81 | 98 | 4.9 | 4.2 | 5.1 | 126 | 6.7 |
| Glass transition temperature (° C.) |  | 116 | 120 | 123 | 136 | 145 | 128 | 126 | 143 | 146 | 93 |

(Unit: parts by weight)

As seen from the results above, in Examples 1 to 8, a resin composition assured of a low Y.I. value and high transparency even after ultraviolet irradiation or heat-curing is obtained and the molded product after heat treatment in all of these Examples has a glass transition temperature of 100° C. or more.

On the other hand, in Comparative Example 1 where the amount of the photo-acid generator is excess, the Y.I. value is low at the initial stage (after UV irradiation) but after heat-curing or reflow, the Y.I. value becomes high and poor transparency results. In Comparative Example 2, a resin molded product having a low Y.I. value (high transparency) is obtained, but the glass transition temperature is less than 100° C. and only a molded product having a low glass transition temperature is obtained. Incidentally, when the resin composition of Example 1 was prepared by changing the amount of the photo-acid generator to be less than 0.01 g and the same sample as in Example 1 was produced, the curing was insufficient and a desired hardness could not be obtained.

These results reveal that the ultraviolet-curable transparent resin composition of the present invention has high transparency and high heat resistance reliability and therefore, is excellent as a material of an optical component. Additionally, the optical component using this resin composition is free from discoloration or deformation even under heat during solder reflow and assured of stable mechanical properties and therefore, can be advantageously used when mounting an imaging device en bloc by solder reflow.

Production of Optical Lens and Evaluation of Dynamic Viscoelasticity and Colorability Thereof Resin Compositions (1) to (4) were prepared as follows.
Preparation of Resin Composition (1):
Resin Composition (1) was prepared by adding 35 g of bisphenol A-type epoxy resin (EPIKOTE 827, produced by Japan Epoxy Resins Co., Ltd.), 35 g of alicyclic epoxy resin (CEL-2021P, produced by Daicel Chemical Industries, Ltd.), 30 g of oxetane compound (ARON OXETANE OXT-211, produced by Toagosei Co., Ltd.) and 4 g of a polycarbonate solution of photo-acid generator (CPI-100P, produced by SAN-APRO Ltd.) (in the solution, the amount of the photo-acid generator was 2 g) and mixing these components with stirring at 50° C. for 10 minutes.

Preparation of Resin Composition (2):
Resin Composition (2) was prepared by adding 35 g of bisphenol A-type epoxy resin (EPIKOTE 827, produced by Japan Epoxy Resins Co., Ltd.), 35 g of alicyclic epoxy resin (CEL-2021P, produced by Daicel Chemical Industries, Ltd.), 30 g of oxetane compound (ARON OXETANE OXT-211, produced by Toagosei Co., Ltd.) and 1 g of a polycarbonate solution of photo-acid generator (CPI-101A, produced by SAN-APRO Ltd.) (in the solution, the amount of the photo-acid generator was 0.5 g) and mixing these components with stirring at 50° C. for 10 minutes.

Preparation of Resin Composition (3):
Resin Composition (3) was prepared by adding 35 g of bisphenol A-type epoxy resin (EPIKOTE 827, produced by Japan Epoxy Resins Co., Ltd.), 35 g of alicyclic epoxy resin (CEL-2021P, produced by Daicel Chemical Industries, Ltd.), 30 g of oxetane compound (ARON OXETANE OXT-211, produced by Toagosei Co., Ltd.) and 0.6 g of a polycarbonate solution of photo-acid generator (CPI-101A, produced by SAN-APRO Ltd.) (in the solution, the amount of the photo-acid generator was 0.3 g) and mixing these components with stirring at 50° C. for 10 minutes.

Preparation of Resin Composition (4):
Resin Composition (4) was prepared by adding 35 g of bisphenol A-type epoxy resin (EPIKOTE 827, produced by Japan Epoxy Resins Co., Ltd.), 35 g of alicyclic epoxy resin (CEL-2021P, produced by Daicel Chemical Industries, Ltd.), 30 g of oxetane compound (ARON OXETANE OXT-211, produced by Toagosei Co., Ltd.) and 6 g of a polycarbonate solution of photo-acid generator (CPI-101A, produced by SAN-APRO Ltd.) (in the solution, the amount of the photo-acid generator was 3 g) and mixing these components with stirring at 50° C. for 10 minutes.

Examples 9 to 13 and Comparative Examples 3 and 4

Each resin composition was potted (resin potting) on a silicone release-treated PET film (DIAFOIL MRA-50, produced by Mitsubishi Polyester Film Corp.), and a glass-made lens shape-forming mold was pressed thereon to fill the resin composition into the forming mold. Thereafter, an ultraviolet ray was irradiated on the resin composition through the forming mold under the ultraviolet irradiation condition (irradiation amount) shown in Table 2 below, and the resulting cured product was demolded from the forming mold and then heat-treated under the heat-curing conditions shown in Table 2 below to produce a resin cured product (optical lens) (see, FIGS. 1A to 1D).

The thus-obtained resin cured products (optical lens) were evaluated for various properties according to the following criteria. The results obtained are shown together in Table 2 below.

Dynamic Viscoelasticity:

Each resin cured product was cut into a specimen of 5 mm in width and 35 mm in length and measured for the storage modulus and loss modulus by a dynamic viscoelasticity meter (RS-II, manufactured by Rheometrics) at a frequency of 1 Hz in a temperature range of RT (25° C.) to 260° C. This measurement was repeated two times and the values of tan δ obtained were plotted to prepare a curve line of tan δ. Subsequently, a tangential line was drawn on the tan δ curve before and after the rising temperature, and the point at which these tangential lines were crossing was defined as the rising temperature of the tan δ curve in the range of RT to 260° C. Furthermore, ΔT was calculated by subtracting the rising temperature ($Ts_1$) obtained in the first measurement from the rising temperature ($Ts_2$) obtained in the second measurement. The heat-curing conditions giving ΔT<10° C. was rated "Good", and the heat-curing conditions giving ΔT≧10° C. was rated "Poor".

Colorability:

The resin cured product was cut into a specimen of 20 mm in width and 30 mm in length and measured for the yellow index value in a transmission mode by a color computer (SM-T, manufactured by Suga Test Instruments Co., Ltd.). When the value obtained was less than 10, the specimen was rated "Good", and when 10 or more, this was rated "Poor".

tion resistance resulted. In Comparative Example 4, the yellow index value after curing was low, but since the rising temperature of the tan δ curve obtained by the dynamic viscoelasticity measurement fluctuated by 10° C. or more after repeating the measurement two times, it was confirmed that the molded product obtained only by ultraviolet curing failed in reaching a stable crosslinked state. Incidentally, when Resin Composition (1) used in Example 9 was prepared by changing the amount of the photo-acid generator to be less than 0.05 g and the same sample as in Example 9 was produced, the curing was insufficient and a desired hardness could not be obtained.

These results reveal that according to the production method of an optical lens of the present invention, a plastic-made optical lens having mechanical and optical properties stable to the heat stress and being excellent in the transparency can be provided. By this production method, simplification and cost reduction in the step of mounting an imaging device can be achieved without impairing the optical properties of the optical lens. The optical lens of the present invention can greatly contribute to quality enhancement when this production method is employed.

While the invention has been described in detail and with reference to specific embodiments thereof, it will be apparent to one skilled in the art that various changes and modifications can be made therein without departing from the spirit and scope thereof.

This application is based on Japanese Patent Applications (Patent Application Nos. 2008-142150 and 2008-14215 1) filed on May 30, 2008, the entirety of which is incorporated herein by way of reference.

All references cited herein are incorporated by reference herein in their entirety.

What is claimed is:

1. A resin composition for optical components, which is an ultraviolet-curable transparent resin composition used as a material for an optical component,

TABLE 2

|  | Example | | | | | Comparative Example | |
| --- | --- | --- | --- | --- | --- | --- | --- |
|  | 9 | 10 | 11 | 12 | 13 | 3 | 4 |
| Kind of resin composition | (1) | (2) | (2) | (2) | (3) | (4) | (2) |
| Ultraviolet irradiation dose (mJ/cm$^2$) | 4000 | 4000 | 8000 | 8000 | 8000 | 16000 | 8000 |
| Heat-curing conditions | 100° C. × 1 hr | 100° C. × 1 hr | 100° C. × 1 hr | 80° C. × 1 hr | 100° C. × 1 hr | 100° C. × 1 hr | — |
| Dynamic Viscoelasticity ΔT (° C.) | 3 | 5 | 4 | 4 | 5 | 3 | 36 |
| Rating | Good | Good | Good | Good | Good | Good | Poor |
| Colorability Yellow index value | 3.8 | 6.8 | 7.2 | 6.4 | 4.7 | 17 | 3.8 |
| Rating | Good | Good | Good | Good | Good | Poor | Good |

As seen from the results above, in Examples 9 to 13, the fluctuation of the rising temperature of the tan δ curve obtained by the dynamic viscoelasticity measurement after heat curing was less than 10° C. even after repeating the measurement two times, and it was confirmed that the molded product obtained under each curing conditions reached a sufficiently crosslinked state and a cured product small in the characteristic fluctuation due to heat was obtained. Also, in all specimens, the yellow index value after heat-curing was confirmed to be less than 10.

On the other hand, in Comparative Example 3 where the amount of the photo-acid generator was excess, poor colorawherein said resin composition comprises the following components (A) to (C):

(A) an epoxy resin having two or more epoxy groups in one molecule thereof;

(B) an oxetane compound having one or more oxetanyl groups in one molecule thereof; and (C) an onium salt comprising an anion component represented by the following formula (1) and a cation component:

$$[PF_n(X)_{6-n}]^- \quad (1)$$

wherein n is an integer of 1 to 5, and X is a fluorinated alkyl group having a carbon number of 1 to 9 or a fluorinated phenyl group as a photo-acid generator;

and wherein the component (C) is contained in an amount of 0.01 to 2.0 parts by weight based on 100 parts by weight of a total amount of the components (A) and (B).

2. The resin composition for optical components according to claim 1, wherein the amount of the (C) photo-acid generator is 0.01 to 0.5 parts by weight based on 100 parts by weight of the total amount of the components (A) and (B).

3. An optical component obtained by using the resin composition for optical components according to claim 1.

4. The optical component according to claim 3, which is an optical lens.

5. A method for producing an optical lens, said method comprising:

filling the resin composition for optical components according to claim 1 into a lens shape-forming mold;

irradiating the resin composition in said forming mold with an ultraviolet ray to cure the resin composition into a lens shape, thereby obtaining a cured product; and subjecting the cured product to a heat treatment.

6. The method for producing an optical lens according to claim 5, which comprises: potting the resin composition for optical components on a transparent substrate; and pressing the lens shape-forming mold thereon to fill the resin composition into the forming mold.

7. The method for producing an optical lens according to claim 5, wherein said heat treatment is performed at 80 to 150° C. for 1 to 5 hours.

8. An optical lens obtained by the method according to claim 5.

* * * * *